United States Patent [19]
Kerkar

[11] Patent Number: 5,472,583
[45] Date of Patent: Dec. 5, 1995

[54] MANUFACTURE OF CONICAL PORE CERAMICS BY ELECTROPHORETIC DEPOSITION

[75] Inventor: Awdhoot V. Kerkar, Columbia, Md.

[73] Assignee: W. R. Grace & Co.-Conn., New York, N.Y.

[21] Appl. No.: 406,257

[22] Filed: Mar. 16, 1995

Related U.S. Application Data

[63] Continuation of Ser. No. 101,648, Sep. 20, 1993, abandoned, is a continuation of Ser. No. 950,355, Sep. 24, 1992, Pat. No. 5,340,779.

[51] Int. Cl.[6] .................................................. C25D 13/02
[52] U.S. Cl. ............................................... 204/181.5
[58] Field of Search ............................ 204/181.5, 180.2

[56] References Cited

U.S. PATENT DOCUMENTS

| | | | |
|---|---|---|---|
| 4,233,107 | 11/1980 | Johnson, Sr. ............................ | 156/632 |
| 4,361,630 | 11/1982 | Johnson, Sr. ............................ | 428/613 |
| 4,683,168 | 7/1987 | Hares et al. ............................ | 428/335 |
| 5,021,376 | 6/1991 | Nienburg et al. ...................... | 501/153 |

FOREIGN PATENT DOCUMENTS

| 81995 | 5/1983 | Japan | ................................. 204/181.1 |
|---|---|---|---|

OTHER PUBLICATIONS

Choudhary et al, "Electrophoretic Deposition Of Alumina From Aqueous Suspension", Trans. J. Br. Ceram. Soc., 81, 189–193, 1982.

*Primary Examiner*—John Niebling
*Assistant Examiner*—Kishor Mayekar
*Attorney, Agent, or Firm*—Mary Ann Capria

[57] ABSTRACT

Ceramic bodies having conically shaped pores are produced by electrophoretic deposition from aqueous ceramic particle suspensions. The dense ceramic bodies may be fabricated in the form of tubes having the pores radiating inward or outward. Alternatively, other shapes may be fabricated. The bodies are useful as filters, burner elements, catalysts supports, etc.

8 Claims, 1 Drawing Sheet

MANUFACTURE OF CONICAL PORE CERAMICS BY ELECTROPHORETIC DEPOSITION

This is a continuation of application Ser. No. 08/101,648, filed Sep. 20, 1993, now abandoned and a division of application Ser. No. 07/950,355, filed Sep. 29, 1992, now U.S. Pat. No. 5,340,779.

FIELD OF THE INVENTION

The invention relates to ceramic articles having conical pore morphology and methods of producing such ceramic articles by electrophoretic deposition.

BACKGROUND OF THE INVENTION

Porous ceramic articles are widely used as adsorbents, catalyst supports, filters, burner elements, etc. The usefulness of a porous ceramic article for a particular purpose is at least partially related to the pore morphology of the ceramic article. Consequently, there is a constant desire for ceramic articles having new and useful pore morphologies as well as for inexpensive methods for producing such articles.

Electrophoresis is a process whereby particles in a liquid suspension are drawn toward an electrode when an electric field is applied across the suspension. The direction and rate that a particle travels depends on the charge present on the particle's surface, the conditions of the medium in which the particle is suspended, conditions at the electrode(s), the electrical potential applied and the characteristics of the particle itself.

Often, the surface charge on a particle can be varied by changes in the pH, the concentration of electrolyte in the medium and/or by addition of a polyelectrolyte adapted to interact with the particle surface.

In the past, electrophoresis has been used to produce alumina coatings on stainless steel plates by Choudhary et al., *Trans. J. Br. Ceram. Soc.* 81, pp. 189–193 (1982). Choudhary et al. employed an aqueous suspension containing the alumina particles.

Electrophoresis has also been used to deposit enamel coatings from various suspensions onto workpieces. An example of enamel deposition is disclosed in U.S. Pat. No. 4,466,871 to Kaup et al.

Some have used electrophoresis to produce three-dimensional ceramic shapes such as described by Heavens in the article "Manufacture of Beta Alumina Shapes by Electrophoretic Deposition," *Brit Ceram. Proc.* No. 38, Davidge, R. W. ed., pp. 119–126 (1986). Most of the three-dimensional shapes formed have been deposited on relatively large diameter electrodes (e.g., greater than 1 inch wide). Most of these prior art processes have involved the use of organic suspension media as opposed to aqueous media. Aqueous media have been avoided (except in the area of thin film coatings) because of problems caused by hydrogen evolution at the cathode or oxygen evolution at the anode due to electrolysis of water.

SUMMARY OF THE INVENTION

The invention provides porous ceramic articles having conically-shaped pores. The invention also encompasses methods of producing such ceramic articles by electrophoretic deposition from an aqueous suspension. The articles of the invention are useful as ceramic filters, particulate traps, emission control burners, catalyst supports, etc.

In one aspect, the invention encompasses ceramic articles having a plurality of conically-shaped pores. The narrow end of the pores preferably ranges from about 0.5–5 microns in diameter. The wide end of the pores preferably ranges from about 20–200 microns. The articles may be formed of any ceramic material or combination of materials. In one preferred embodiment, the article comprises a hollow core section where the conical pores communicate between the core and the outer surface of the body. Alternatively, the articles of the invention may be in the form of sheets, plates or other shapes.

The invention further encompasses methods for producing ceramic articles having conically-shaped pores using electrophoretic deposition. The method of the invention comprises:

a) forming an aqueous colloidal suspension comprising ceramic particles, a dispersant, a defoaming agent, water and ions in addition to ions solely based on water molecules, b) placing electrodes into the suspension, at least one of the electrodes being a deposition electrode, c) applying a voltage across the electrodes whereby at least some of the ceramic particles are deposited on the deposition electrode, d) recovering the deposited ceramic body having conically shaped pores.

Graphite is a preferred deposition electrode material. The recovering step preferably comprises firing the ceramic deposit whereby a sintered ceramic body with conical pores results.

The ceramic particles may be any known ceramic material or combination of materials. The water component preferably contain ions sufficient to give the aqueous medium a conductance value which promotes electrolysis at a rate conducive to the formation of conically shaped pores in the deposit. Binders, dispersants, defoaming agents and other expedients may also be added to the suspension.

The deposition electrode is preferably a graphite rod, group of rods, the graphite coated interior of a dense ceramic object (e.g. a crucible) or any other suitable electrode shape or configuration. The deposition electrode may also be formed of metal or other suitably conductive material.

These and other aspects of the invention will be described in more detail below.

DETAILED DESCRIPTION OF THE INVENTION

Figure 1:
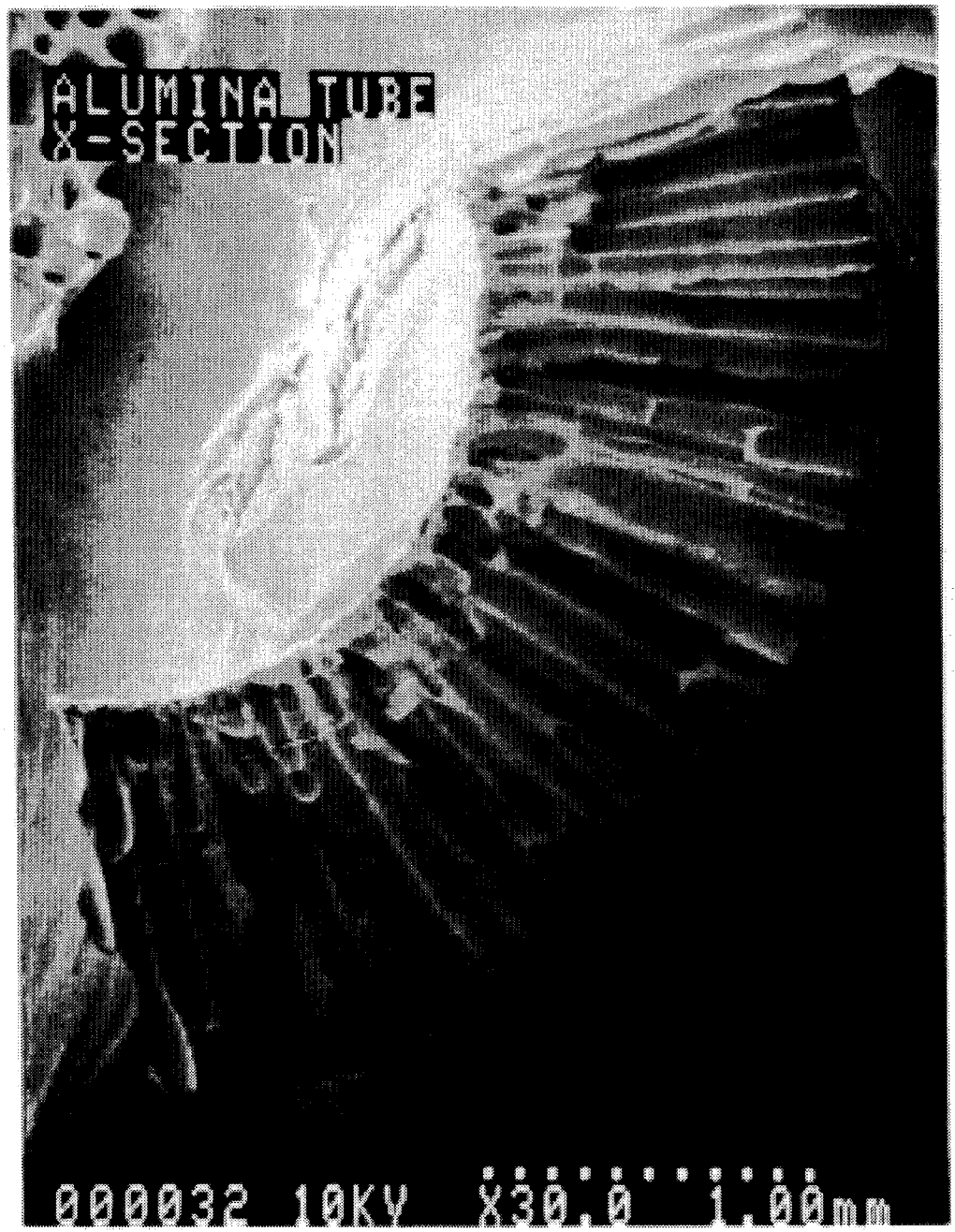
FIG. 1 is a micrograph at 30×magnification of a cross section of an alumina produced by the method of the invention.

The ceramic bodies of the invention are characterized by the presence of conically shaped pores.

The pores each comprise a narrow end and a wide end. The narrow ends may vary in diameter depending on the process conditions used to make the body. Preferably, the narrow ends of the pores range from about 0.5–5 µm in diameter. The wide ends may also vary in diameter depending on the fabrication conditions. Preferably, the wide ends of the pores range from about 20–200 µm in diameter. The length of the pores is preferably about 0.5–5 mm.

Preferably, at least some of the conical pores communicate with an outer surface of the body. More preferably, all the conical pores communicate with an outer surface. The conical pores may be oriented such that either the wide ends or the narrow ends contact an outer surface.

The ceramic bodies of the invention may contain one or more cavities or hollow cores. If one or more cavities or hollow cores are present in the ceramic body, preferably at least some of the conical pores communicate with a cavity or core. More preferably, all of said conical pores communicate with a cavity or core. Preferably, and such conical pores contacting a cavity or core also contact an outer surface of the body. The pores are preferably oriented radially about the cavity or core such that either the narrow ends or the wide ends of the pores contact the cavity or core.

The ceramic bodies of the invention may be formed from any ceramic material or combination of materials. Preferred ceramic materials are oxide ceramics such as alumina, silica, zirconia, titania, zirconium aluminum titanante, cordierite, mullite and mixtures thereof. The preferred ceramic material may depend on the intended end use of the body. The ceramic bodies of the invention are useful for filters, particle traps, catalyst supports, emission control burners, and other applications.

While the ceramic bodies of the invention are not limited to those produced by any particular method, the invention encompasses a novel method which is particularly useful for producing ceramic bodies having conically shaped pores.

The process of the invention comprises:

a) forming an aqueous colloidal suspension comprising ceramic particles, a dispersant, a defoaming agent, water and ions in addition to those ions solely based on water molecules, b) placing electrodes into the suspension, at least one of the electrodes being a deposition electrode, c) applying a voltage across the electrodes whereby at least some of the ceramic particles are deposited on the deposition electrode, and d) recovering the deposited ceramic body having conically shaped pores.

The aqueous suspension may be formed by combining the ceramic particles, the dispersant, the defoaming agent, water and additional ions. The additional ions are preferably present in a sufficient amount to give the aqueous medium a conductance value which promotes electrolysis at a rate conducive to the formation of conically shaped pores in the deposit. The range of suitable conductance values may vary depending on the deposition voltage, the electrode configuration and other parameters. In general, the aqueous medium preferably has a conductance of about $10^{-7}$–$10^{-3}$ ohm$^{-1}$ cm$^{-1}$. If an impure water source (e.g. tap water) is used, the ion content of the impure water may impart sufficient conductance to the aqueous medium.

The ceramic particles used may be of any desired ceramic material or combination of materials. Preferred ceramic materials are oxide ceramics such as alumina, titania, silica, zirconia, zirconium aluminum titanate, cordierite, mullite and mixtures thereof. Preferably, the particles average about 0.1–5 μm in diameter. Equiaxed particles are generally preferred over platelets or other particle shapes. Ceramic sintering aid particles may also be included.

Other components may optionally be added to the aqueous suspension. For example, binders and/or pH adjusting agents may be added to the suspension. Preferred binders are water soluble binders such as Rhoplex® B-60A sold by Rohm & Haas and Flexbond® sold by Air Products Co. The dispersant may be any conventional dispersant such as Darvan® 821A sold by R. T. Vanderbilt, Inc. pH adjusting agents may be acids or bases. The defoaming agent is preferably Tergitol® sold by Union Carbide.

The components making up the aqueous suspension may be combined using any conventional mixing apparatus.

The deposition electrode preferably has a specific electrical resistance of about $10^{-5}$–$5\times10^{-3}$ Ω-cm. Graphite or materials comprising graphite are preferred deposition electrode materials since they can be easily removed by firing in air after the deposition. However, other conductive electrodes may also be used.

Preferably, the deposition electrode is made to be the anode. In such cases, the aqueous suspension will be adjusted to a pH of about 9–11, preferably about 10. Alternatively, the cathode can be made to be the deposition electrode by lowering the pH to about 2–3. Variations from the preferred pH values may be made without departing from the scope of the invention.

The deposition electrode or group electrodes preferably corresponds in shape to the shape of the ceramic body to be produced. The deposition electrode is not limited to any particular shape.

The conical pores generally grow away (in a normal direction) from the deposition electrode surface. The narrow ends of the pores are located at the deposition electrode surface, and the wide ends are furthest from the electrode. Thus, a graphite rod deposition electrode would produce a ceramic tube with the wide ends of the pores at the outer surface of the tube. A dense tube-shaped ceramic crucible with a coating of graphite on its inner surface can be used to produce a tube with the narrow ends of the pores at the outer surface of the deposited tube. If multiple deposition electrodes are placed close enough to each other, then joined tube deposits can be produced. A sheet-like electrode would result in a plate-shaped deposit.

One or more counter electrodes are also placed in contact with the aqueous suspension. The deposition rate is a function of several parameters such as the particle concentration in the suspension, the deposition electrode surface area, the conductance of the aqueous medium, and the deposition voltage.

The deposition voltage is a DC voltage, preferably about 1–20 volts. An increase in deposition voltage causes an increase in deposition rate. The deposition rate may depend on variables such as deposition voltage, the deposition surface area, concentration of ceramic particles in the slurry, etc. Higher deposition voltages generally correspond to larger pore sizes. The diameter of the wide ends of the pores increases with the thickness of the deposit. The process of the invention typically produces pores having narrow ends averaging about 1 μm or less in diameter and wide ends averaging about 20–200 μm. The thickness of the deposit is preferably about 1–5 mm.

Once the desired deposit is achieved, the deposit is then recovered either by physical separation of the deposit from the electrode or by destroying at least a portion of the electrode by chemical reaction and/or by heating. Preferably, the deposit and deposition electrode are subjected to a firing whereby the deposit is densified and the electrode is partially or completely destroyed. Alternatively, the deposit may be first separated from the deposition electrode and then fired to produce a dense ceramic body having conically shaped pores. In such cases, the firing temperature would preferably be in the range of conventional sintering temperatures for the specific ceramic involved.

If desired, the ceramic deposit may be treated by conventional ceramic processing techniques before or after firing to join the deposit with other compatible parts.

The invention is further illustrated by the following examples. It should be understood that the invention is not limited to the details of the examples.

EXAMPLES

Example 1

1N NaOH solution (about 3.6 g) was added to 120 g of tap water to adjust the pH to 10. 3.6 g Darvan® 821A dispersant was then added to the water. 180 g of alumina was added to the mixture with stirring to form a slurry. The slurry was then ultrasonically agitated for about 5 minutes. 3.6 g Rhoplex® B-60A binder was added to the slurry followed by stirring for about 30 minutes. About 5 ml of defoaming agent (Tergitol® sold by Union Carbide, Inc.) was then added to the slurry.

The slurry was then transferred to an electrophoretic cell. A 99.5% pure extruded graphite rod (⅛" diameter) was inserted into the slurry to serve as the deposition electrode (anode). A cylindrical stainless steel counter electrode (cathode) was inserted into the slurry to surround the graphite deposition electrode. A voltage was applied across the electrodes to establish a current of about 0.3 amps. The deposition, at that current level, was carried out for about one minute. The graphite rod with the alumina deposit was removed from the cell. The deposit was dried for 3 hours and then sintered in air according to the following schedule:

i) heat to 700° C. in 5 hours,
 ii) hold at 700° C. for 3 hours,
 iii) heat to 1650° C. in 3 hours,
 iv) hold at 1650° C. for 2 hours, and
 v) cool to room temperature in 6 hours.

The resulting ceramic part was a tube with conical pores radiating from the hollow portion of the tube to the outer surface. A magnified (30×) cross section of the fired tube is shown in FIG. 1. The narrow ends of the pores contacted the hollow portion of the tube. The fired tube had a wall thickness of about 1 mm. The narrow ends of the pores averaged about 1 µm in diameter with the wide ends averaging about 30 µm in diameter.

Example 2

A porous zirconia tube was prepared by the deposition steps of example 1 with the substitution of zirconia powder for the alumina powder of example 1. The deposit was dried in air for 3 hours and then fired in air according to the following schedule:

i) heat to 700° C. in 5 hours,
 ii) hold at 700° C. for 3 hours,
 iii) heat to 1550° C. in 3 hours, and
 iv) hold at 1550° C. for 2 hours.

The fired tube had a wall thickness of about 1 mm. The narrow ends of the pores averaged about 1 µm in diameter with the wide ends averaging about 30 µm in diameter.

Example 3

A machined graphite crucible (0.5" D×1.25" H) was used as deposition electrode (anode). Alumina slurry, described in example 1, was poured into the crucible. A graphite rod was suspended in the slurry and used as a counter-electrode (cathode). A DC potential of 4–10 V was applied to maintain an initial deposition current of 0.3 amperes. Deposition was continued till the current dropped to below 0.05 amperes at 10 volts (~15 seconds). The excess slurry was poured out of the crucible. The deposited layer was dried in air for about 3 hours. The crucible was fired in air at 1650° C. for 1 hour with an intermediate hold at 700° C. for 2 hours for burnout of the graphite crucible. The resultant sintered alumina tube had narrow pore ends on the outer surface while the wide ends were on its inner surface.

Example 4

A sintered alumina crucible (1" D×1.5" H) was used for the experiment. A piece of Grafoil® paper was also tried by rolling it up against the wall of the crucible. The best results were obtained with the Grafoil® paper followed by coating with a graphite paint. The coating was allowed to dry and was baked at 450° C. for 1 hour to burn off the organic binders present in the paint. EPD was performed as indicated in Example 3. The crucible was fired in air as indicated above. During the heat treatment, the dense alumina crucible expanded outward, the deposited porous alumina layer shrank inward. The part was easily withdrawn with no cracking.

What is claimed is:

1. A method of producing a porous ceramic body having conically shaped pores comprising:

a) forming an aqueous colloidal suspension comprising ceramic particles above 0.5 µm in size, a dispersant, a defoaming agent, water and ions in a sufficient amount to give the suspension a conductive value of from $10^{-5}$ to $10^{-3}$ $ohm^{-1}$ $cm^{-1}$, b) placing electrodes into the suspension, at least one of the electrodes being a deposition electrode, c) applying a voltage across said electrodes whereby at least some of the ceramic particles are deposited on said deposition electrode, and d) firing said deposition electrode and deposited ceramic particles to obtain a sintered ceramic body having conically shaped pores.

2. The method of claim 1 wherein said deposition electrode is an anode.

3. The method of claim 1 wherein said deposition electrode is a graphite rod.

4. The method of claim 1 wherein a plurality of deposition electrodes are placed into the suspension.

5. The method of claim 1 wherein said deposition electrode is a graphite-coated surface of a dense ceramic article.

6. The method of claim 2 wherein said suspension has a pH of about 9–11.

7. The method of claim 1 wherein said deposition electrode is a cathode and said suspension has a pH of about 2–3.

8. The method of claim 1 wherein said suspension also contains a binder.

\* \* \* \* \*